US006980554B2

(12) United States Patent
Shibata et al.

(10) Patent No.: US 6,980,554 B2
(45) Date of Patent: Dec. 27, 2005

(54) METHOD AND APPARATUS FOR CONNECTING LINES IN LINE CONCENTRATOR OF SWITCHING SYSTEM

(75) Inventors: Shunichi Shibata, Fukuoka (JP); Fumikiyo Kikukawa, Fukuoka (JP); Kenji Maeda, Fukuoka (JP); Hirofumi Mitome, Fukuoka (JP); Ryoji Matsuno, Fukuoka (JP); Tsuyoshi Takehiro, Fukuoka (JP); Hiroshi Yamamoto, Fukuoka (JP); Toshiharu Eto, Fukuoka (JP); Akihiro Horiuchi, Fukuoka (JP)

(73) Assignee: Fujitsu Limited, Kanagawa (JP)

( * ) Notice: Subject to any disclaimer, the term of this patent is extended or adjusted under 35 U.S.C. 154(b) by 820 days.

(21) Appl. No.: 09/767,327

(22) Filed: Jan. 23, 2001

(65) Prior Publication Data

US 2001/0026534 A1    Oct. 4, 2001

(30) Foreign Application Priority Data

Mar. 31, 2000  (JP) .............................. 2000-099379

(51) Int. Cl.[7] .......................... H04L 12/28; G01R 31/08
(52) U.S. Cl. .................. 370/395.2; 370/535; 370/219; 370/389
(58) Field of Search ............................... 370/241, 247, 370/250, 251, 244, 395.1, 352, 235, 236, 370/229, 230, 434, 431, 432, 433, 535, 231, 370/264, 524, 400

(56) References Cited

U.S. PATENT DOCUMENTS

| 5,023,604 | A | * | 6/1991 | Takase et al. ................ 370/434 |
| 5,892,772 | A | * | 4/1999 | Hauris et al. ................ 370/477 |
| 5,999,532 | A | * | 12/1999 | Terasaki ................... 370/395.3 |
| 6,031,838 | A | * | 2/2000 | Okabe et al. ............. 370/395.6 |
| 6,625,118 | B1 | * | 9/2003 | Hadi Salim et al. ......... 370/229 |
| 6,674,715 | B1 | * | 1/2004 | Yamada ...................... 370/220 |
| 6,687,258 | B1 | * | 2/2004 | Rothenhofer et al. ........ 370/434 |

FOREIGN PATENT DOCUMENTS

| JP | 56140756 | 11/1981 |
| JP | 11266261 | 9/1999 |

* cited by examiner

Primary Examiner—Hanh Nguyen
(74) Attorney, Agent, or Firm—Katten Muchin Rosenman LLP

(57) ABSTRACT

A method of connecting a line concentrator to other line concentrators in a switching system, wherein a switching unit accommodates the line concentrator is provided. The method includes the steps of analyzing a call received by the switching unit through the line concentrator, and connecting lines that are accommodated by the line concentrator and are connected to the other line concentrators without connecting through the switching unit when the call is detected to be made between the line concentrator and the other line concentrators. Thus, a call can be made to a specific dial number without connecting through the switching unit provided in the switching system. Additionally, a call can also be made by use of another switching unit when a communication path between the switching unit and the line concentrator is overcrowded.

2 Claims, 17 Drawing Sheets

FIG. 11

OVERCROWDING MESSAGE

| MESSAGE NUMBER |
|---|
| LOCATION INFORMATION OF SUBSCRIBER |
| LINE-CONCENTRATING-UNIT NUMBER |

FIG. 12

LCTG # i

METHOD AND APPARATUS FOR CONNECTING LINES IN LINE CONCENTRATOR OF SWITCHING SYSTEM

BACKGROUND OF THE INVENTION

1. Field of the Invention

The present invention relates to a switching system and a method of controlling a line concentrator provided in the switching system to connect lines, and more particularly relates to a switching system and a method of controlling a line concentrator provided in the switching system to connect to other line concentrators.

2. Description of the Related Art

Recently, with the rapid spread of Internet usage, the number of Internet service providers (ISP) that provide services to connect to the Internet, as well as the number of subscribers who use the Internet through dial-up ISP connections, has increased sharply. Additionally, introduction of a flat rate to Internet services has been considered, and thus it is predictable that a percentage of occupation of lines for a long period by ISP-connection subscribers will increase further in the future. Each corporation has been researching and developing a new network that allows Internet users to connect to the Internet constantly. However, it is predicted that it takes time to replace the existing network with the new network completely, and the investment in equipment for each ISP with introduction of the new network is enormous. Under such circumstances, each ISP needs to cope with the rapid spread of the Internet use by using the existing network effectively as well as constructing the new network.

A description will now be given of a network using a conventional switching system with reference to FIG. 1. In FIG. 1, a line-concentrating unit 12 is connected to a switching unit 10. Additionally, a remote line-concentrating unit 16 is connected to the switching unit 10 through trunks 13 and 14. Subscribers A and B are connected to the line-concentrating unit 12. An ISP network 20 is also connected to the line-concentrating unit 12 through a PRI (Primary Rate Interface) 15 of an ISDN (Integrated Services Digital Network) line. Subscribers C and D are connected to the remote line-concentrating unit 16. A subscriber E is connected to the switching unit 10. A switching unit 30 is connected to the switching unit 10 through trunks 17 and 18. A line-concentrating unit 32 is connected to the switching unit 30. In addition, a remote line-concentrating unit 36 is connected to the switching unit 30 through trunks 33 and 34. Subscribers F and G are connected to the line-concentrating unit 32. Subscribers H and I are connected to the remote line-concentrating unit 36. Additionally, a subscriber J is connected to the switching unit 30.

In a case that the subscribers A and C located under the switching unit 10 attempt to connect to the ISP network 20 by a dial-up connection, the subscribers A and C are connected through the PRI 15 to the ISP network 20. To be concrete, in a case that an ISP-connection subscriber such as the subscriber A and the PRI 15 that is connected to the ISP network 20 are located under the line-concentrating unit 12, the subscriber A connects to the PRI 15 via only the line-concentrating unit 12 not through the switching unit 10 when the subscriber A has captured the PRI 15 under the line-concentrating unit 12. Such a method to connect to the PRI 15 simply through the line-concentrating unit 12 by the subscriber A is called an off-road function of a line-concentrating unit.

However, other ISP-connection subscribers such as the subscribers F and H located under the switching unit 30 also connect to the ISP network 20, and they call the switching unit 10 through trunks 17 and 18, and are connected to the ISP network 20 via the PRI 15 located under the switching unit 10. If a large number of the ISP-connection subscribers occupy the lines by use of dial-up connections for a long period as described above, the lines are overcrowded at overcrowded points A through F, and thus general subscribers such as subscribers B, D, E, G, I and J cannot capture the lines for regular calls. The first method to solve the above-described problem is to increase the number of switches in the switching unit 10 and the number of trunks located between the switching units 10 and 30 by a common carrier considering the occupation time of the lines by the dial-up ISP connections. The second method is to provide a new ISP access point 37 indicated by a broken line by an Internet service provider and to provide a PRI 38 that is indicated by a broken line and is connected to the ISP access point 37 under the line-concentrating unit 32 by the common carrier.

However, in the first method, a large number of inefficiently used extension equipment such as the trunks and the switches must be added to the switching units 10 and 30 so as to correspond to long-period calls concentrated in a specific time of a day. Such a method does not follow a design concept of a conventional switching system that minimizes the investment in equipment such as the trunks and the switches by sharing the equipment of the switching system among calls on the assumption that most of the calls are short-period calls. Additionally, the first method includes a problem that it is not simple to maintain and manage the entire network shown in FIG. 1 for providing sufficient services to each of the ISP-connection subscribers and the general subscribers since the equipment such as the trunks and the switches of the switching units 10 and 30 are shared among the long-period calls that are not considered in the conventional switching system and the short-period calls. In the second method, the Internet service provider must extend the ISP network 20 to a remote location for preparing the new ISP access point 37, and thus additional investment in equipment used for extending the ISP network 20 is necessary. In addition, a dial number for accessing each line-concentrating unit must be changed for a subscriber located under a line-concentrating unit to capture a PRI under the line-concentrating unit when accessing the ISP network 20.

SUMMARY OF THE INVENTION

Accordingly, it is a general object of the present invention to provide a method and an apparatus for controlling a switching system to generate alternative communication paths for a call. A more particular object of the present invention is to provide a switching system and a method of connecting a call to a specific dial number without connecting through a switching unit provided in the switching system, and connecting a line concentrator provided in the switching system to another switching unit when a communication path between the switching unit and the line concentrator is overcrowded.

The above-described object of the present invention is achieved by a method of connecting a line concentrator to other line concentrators in a switching system, wherein a switching unit accommodates the line concentrator, the method including the steps of analyzing a call received by the switching unit through the line concentrator, and connecting lines that are accommodated by the line concentrator and are connected to the other line concentrators without connecting through the switching unit when the call is detected to be made between the line concentrator and the other line concentrators.

Thus, a call can be made to a specific dial number without connecting through the switching unit provided in the switching system. Additionally, a call can also be made by use of another switching unit when a communication path between the switching unit and the line concentrator is overcrowded.

Other objects, features and advantages of the present invention will become more apparent from the following detailed description when read in conjunction with the accompanying drawings.

BRIEF DESCRIPTION OF THE DRAWINGS

FIG. 11 is a diagram showing contents of an overcrowding-process message included in an overcrowding-process signal;

FIG. 12 is a diagram showing a line-selecting data table 88;

DESCRIPTION OF THE PREFERRED EMBODIMENTS

A description will now be given of preferred embodiments of the present invention, with reference to the accompanying drawings.

Figure 1:
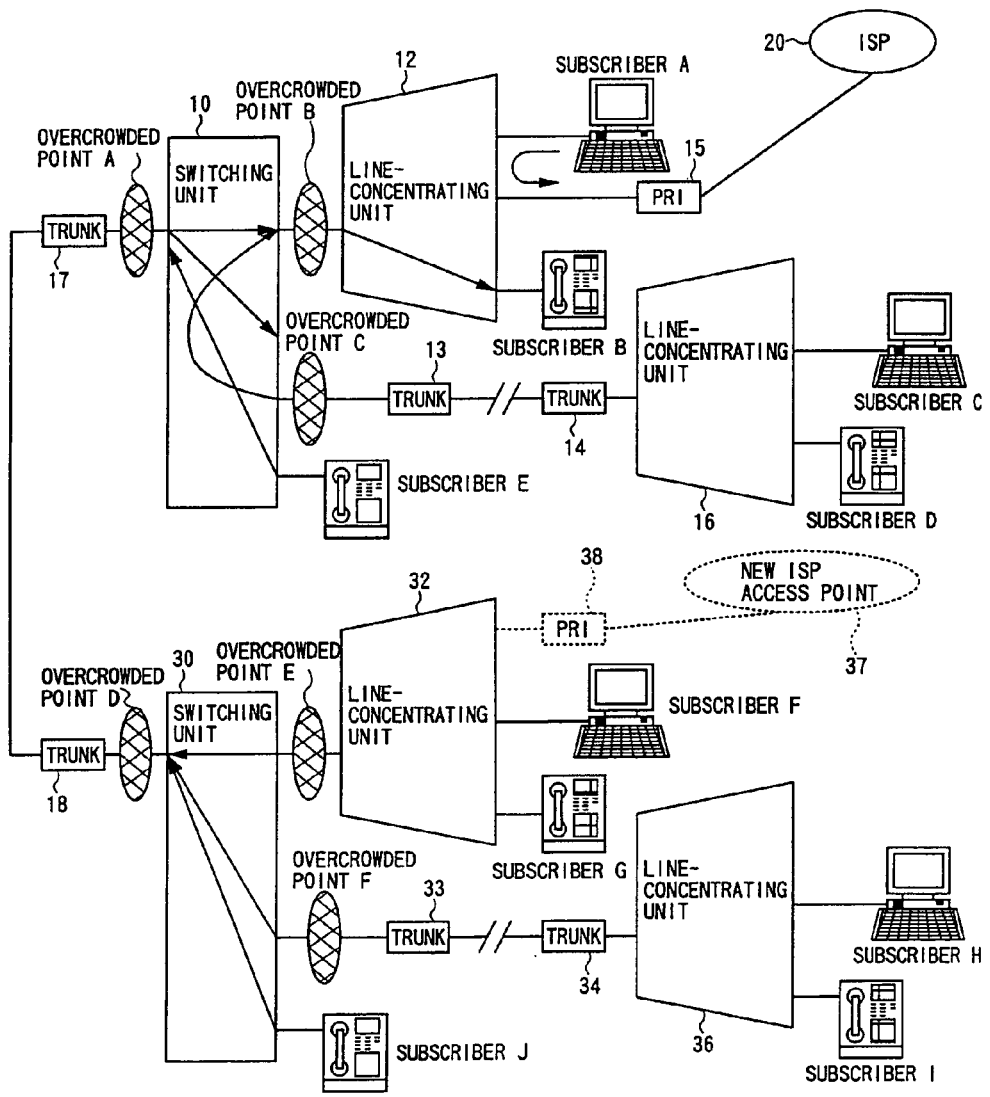
FIG. 1 is a block diagram showing a network using a conventional switching system.
Figure 2:
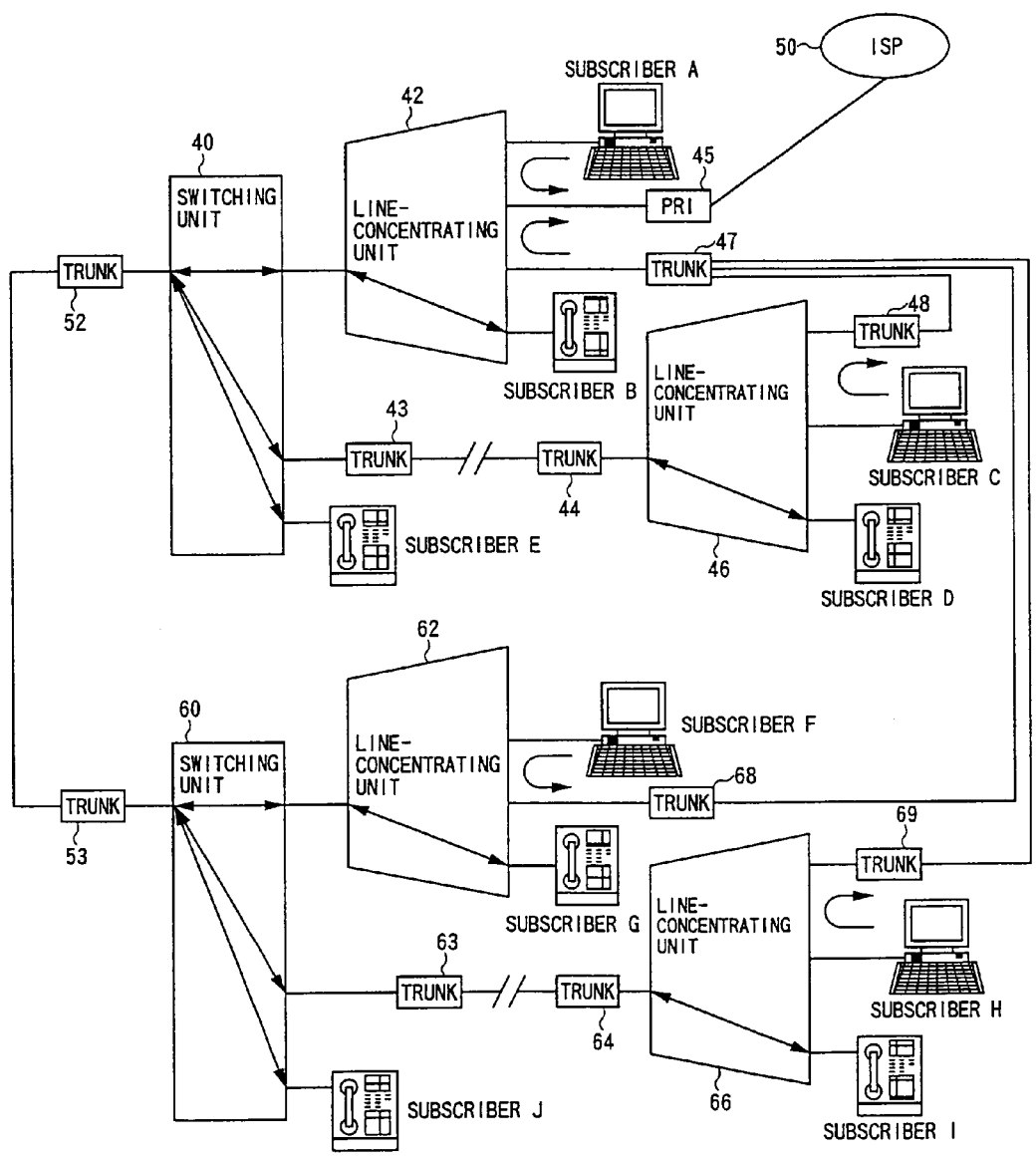
FIG. 2 is a block diagram showing a network to which a switching system of the present invention is applied, according to a first embodiment of the present invention.

FIG. 2 is a block diagram showing a network to which a switching system of the present invention is applied, according to a first embodiment of the present invention. A line-concentrating unit 42 is connected to a switching unit 40. Additionally, a remote line-concentrating unit 46 is connected to the switching unit 40 through trunks 43 and 44. A subscriber A, a subscriber B and a trunk 47 are connected to the line-concentrating unit 42. In addition, an ISP network 50 is connected to the line-concentrating unit 42 through a PRI 45. A subscriber C, a subscriber D and a trunk 48 are connected to the remote line-concentrating unit 46. The trunk 48 is connected to the line-concentrating unit 42 through the trunk 47. A subscriber E is connected to the switching unit 40.

A switching unit 60 is connected to the switching unit 40 through trunks 52 and 53. A line-concentrating unit 62 is connected to the switching unit 60. Additionally, a remote line-concentrating unit 66 is connected to the switching unit 60 through trunks 63 and 64. A subscriber F, a subscriber G and a trunk 68 are connected to the line-concentrating unit 62. The trunk 68 is connected to the line-concentrating unit 42 through the trunk 47. A subscriber H, a subscriber I and a trunk 69 are connected to the remote line-concentrating unit 66. The trunk 69 is connected to the line-concentrating unit 42 through the trunk 47. In addition, a subscriber J is connected to the switching unit 60.

In a case that the subscribers C and D both access the ISP network 50, the remote line-concentrating unit 46 connects each of the subscribers C and D to the trunk 48, and the line-concentrating unit 42 connects the trunk 47 and the PRI 45. Accordingly, each of the subscribers C and D is connected to the ISP network 50 through the remote line-concentrating unit 46, the trunk 48, the trunk 47, the line-concentrating unit 42 and the PRI 45, but not through the switching unit 40. Additionally, in a case that the subscribers F and G both access the ISP network 50, the line-concentrating unit 62 connects each of the subscribers F and G to the trunk 68, and the line-concentrating unit 42 connects the trunk 47 and the PRI 45. Accordingly, each of the subscribers F and G is connected to the ISP network 50 through the line-concentrating unit 62, the trunk 68, the trunk 47, the line-concentrating unit 42 and the PRI 45, but not through the switching units 40 and 60. Similarly, each of the subscribers H and I is connected to the ISP network 50 through the remote line-concentrating unit 66, the trunk 69, the trunk 47, the line-concentrating unit 42 and the PRI 45, but not through the switching units 40 and 60. On the other hand, regular calls among the subscribers B, D, E, G, I and J are connected via the switching units 40 and 60.

Figure 3:
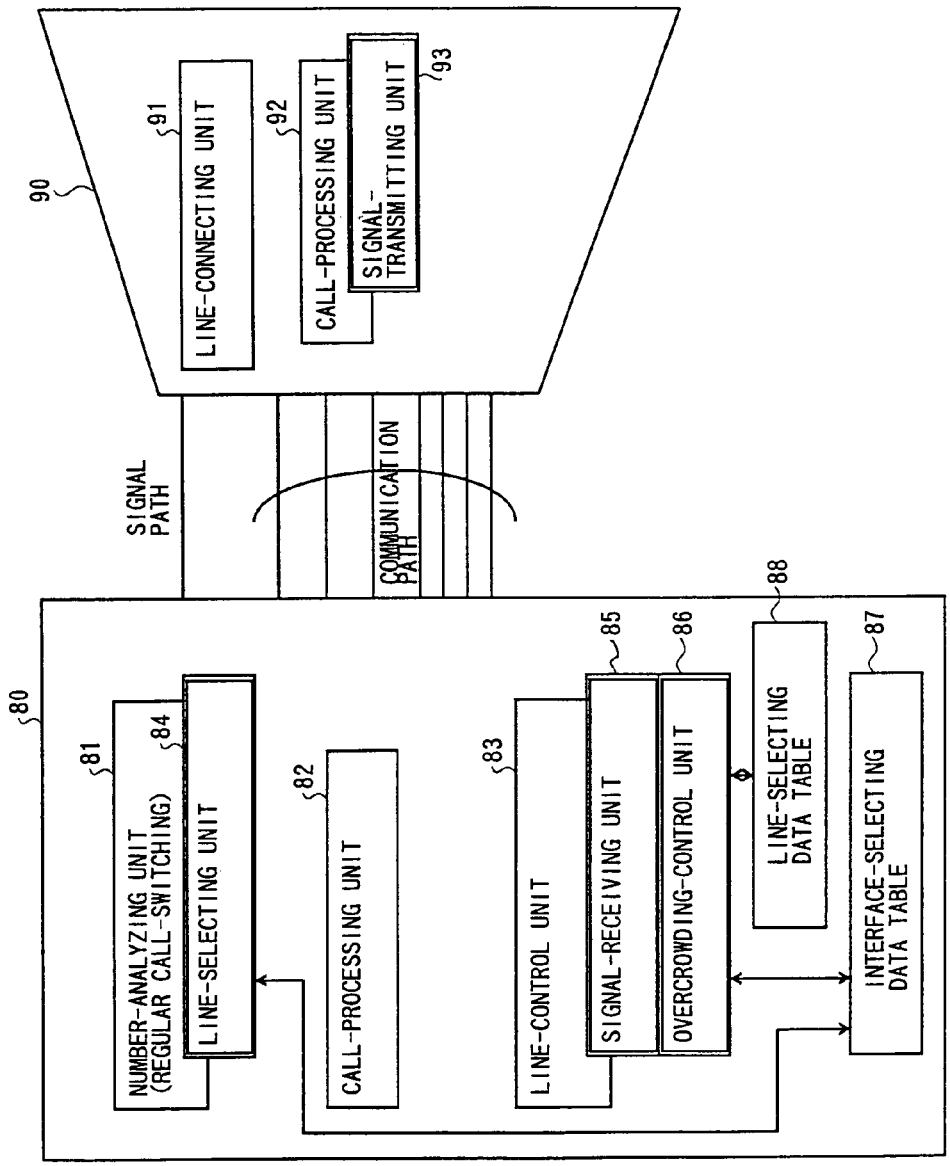
FIG. 3 is a block diagram showing a structure of the switching system according to a second embodiment of the present invention.

FIG. 3 is a block diagram showing a structure of the switching system according to a second embodiment of the present invention. The switching system according to the present invention includes a switching unit 80 and a line-concentrating unit 90. The switching unit 80 shown in FIG. 3 includes a number-analyzing unit 81, a call-processing unit 82, a line-control unit 83, a line-selecting unit 84, a signal-receiving unit 85, an overcrowding-control unit 86, an interface-selecting data table 87 and a line-selecting data table 88. The line-concentrating unit 90 includes a line-connecting unit 91, a call-processing unit 92 and a signal-transmitting unit 93.

The number-analyzing unit 81 analyzes a dial number, and selects its destination line for a regular call switching. The line-selecting unit 84 selects lines located under the line-concentrating unit 90, and then directs the line-concentrating unit 90 to connect the lines therein. The call-processing unit 82 detects a call out and a call in from a line under the switching unit 80 as well as analyzes a call-out signal and a call-in signal supplied from the line-concentrating unit 90, and then executes a call-out process. The line-control unit 83 starts up trunks and executes a call-in process to a subscriber. Additionally, the line-control unit 83 sets a communication path in the switching unit 80, and sets a communication path in the line-concentrating unit 90 when lines connecting a subscriber to another subscriber, a PRI or an ISP network are located under the line-concentrating unit 90. The signal-receiving unit 85 receives an overcrowding-process signal from the signal-transmitting unit 93 of the line-concentrating unit 90, and then starts up the overcrowding-control unit 86. The overcrowding-control unit 86 controls the line-concentrating unit 90 to connect a subscriber located under the line-concentrating unit 90 and a predetermined line located under the line-concentrating unit 90. It should be noted that the line-selecting unit 84 has been added to the number-analyzing unit 81 of a conventional switching unit. The signal-receiving unit 85 and the overcrowding-control unit 86 have been added to the line-control unit 83 of the conventional switching unit. Additionally, the signal-transmitting unit 93 has been added to the call-processing unit 92 of a conventional line-concentrating unit. A description will be given of the interface-selecting data table 87 and the line-selecting data table 88 later.

The line-connecting unit 91 provides a communication path by connecting lines that are located under the line-concentrating unit 90 by following an instruction from the line-selecting unit 84 of the switching unit 80. The call-processing unit 92 detects a call out and a call in from a line located under the line-concentrating unit 90, and secures a communication path between the line-concentrating unit 90 and the switching unit 80 as well as transmits the call-out signal and the call-in signal to the call-processing unit 82 of the switching unit 80. The signal-transmitting unit 93 detects overcrowding on the communication path between the line-concentrating unit 90 and the switching unit 80, and transmits the overcrowding-process signal to the signal-receiving unit 85 of the switching unit 80.

The above-described line-selecting unit 84 can detect a call that is to be made between different line-concentrating units in the switching system from a single dial number received from a subscriber located under any line-concentrating unit 90 that is located under the switching unit 80, and can certainly select a line, an interface connecting the different line-concentrating units and an interface connected to a final destination of the call that are located under the same line-concentrating unit 90 as the subscriber. For instance, when the subscriber F shown in FIG. 2 dials a number to access the ISP network 50, the switching unit 60 captures the trunk 68 certainly, and connects the subscriber F to the ISP network 50 through the line-concentrating unit 62, the trunk 68, the trunk 47, the line-concentrating unit 42 and the PRI 45.

When overcrowding has occurred on the communication path between the switching unit 80 and the line-concentrating unit 90, the signal-transmitting unit 93 provided in the line-concentrating unit 90 detects the overcrowding, and transmits the overcrowding-process signal to the signal-receiving unit 85 of the switching unit 80. Subsequently, the signal-receiving unit 85 receives the overcrowding-process signal from the signal-transmitting unit 93, and starts up the overcrowding-control unit 86. The overcrowding-control unit 86 enables another line-concentrating unit to execute a call-out process by controlling the line-concentrating unit 90 to connect a subscriber as a calling end and a predetermined line, both being located under the line-concentrating unit 90. Accordingly, even if the communication path between the switching unit 80 and the line-concentrating unit 90 is overcrowded when a subscriber makes a call through the communication path, another line-concentrating unit 90 can execute the call-out process for the subscriber, thereby enabling a communication by a call being made between different line-concentrating units.

Figure 4:
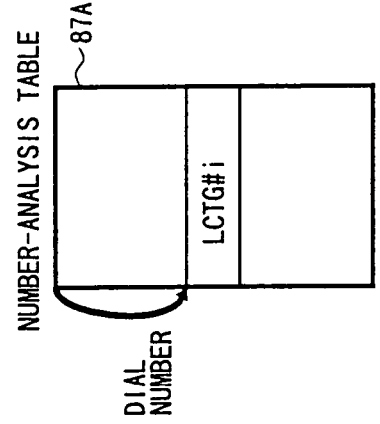
FIG. 4 is a block diagram showing a data structure of an interface-selecting data table 87 according to a third embodiment of the present invention.
Figure 4:
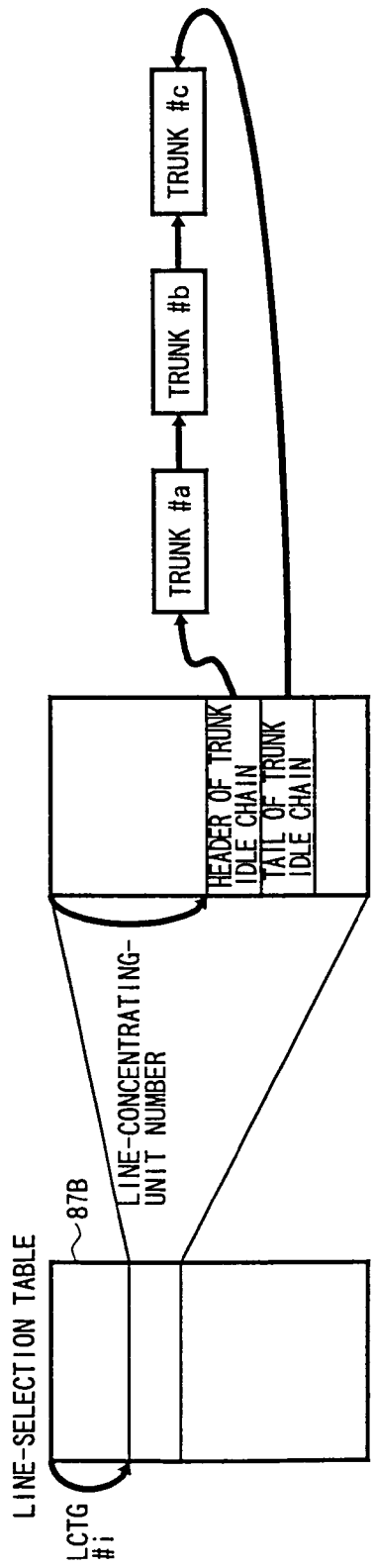

FIG. 4 is a block diagram showing a data structure of the interface-selecting data table 87 according to a third embodiment of the present invention. The interface-selecting data table 87 includes a number-analysis table 87A and a line-selection table 87B. Line-concentrator-trunk-group (LCTG) numbers are initially registered in the number-analysis table 87A as a new trunk group class. The LCTG number is a group number for a group of trunks located under certain line-concentrating units. By searching through the number-analysis table 87 by using a dial number dialed by a subscriber for a call between different line-concentrating units, a LCTG number corresponding to the dial number is obtained therefrom. Additionally, the number-analysis table 87A stores identification numbers of regular trunks, terminals, and primary rate interfaces (PRI) for a dial number that is not used for the call between the different line-concentrating units.

The line-selection table 87B stores a chain of idle trunks, that is, an idle chain, for each line-concentrating unit. The idle chain is created by connecting a number of trunks that are located under a specific line-concentrating unit and are currently not used by any connection lines. An idle trunk is selected from an idle chain that corresponds to a line-concentrating-unit number of a subscriber as a calling end by searching through the line-selection table 87B by use of the LCTG number obtained from the number-analysis table 87A and the line-concentrating-unit number of the subscriber. Accordingly, an interface (a trunk) connecting different line-concentrating units or an interface (a PRI) connected to a final destination can be selected accurately for each of subscribers located under the same switching unit by using the same dial number for each of the subscribers.

Figure 5:
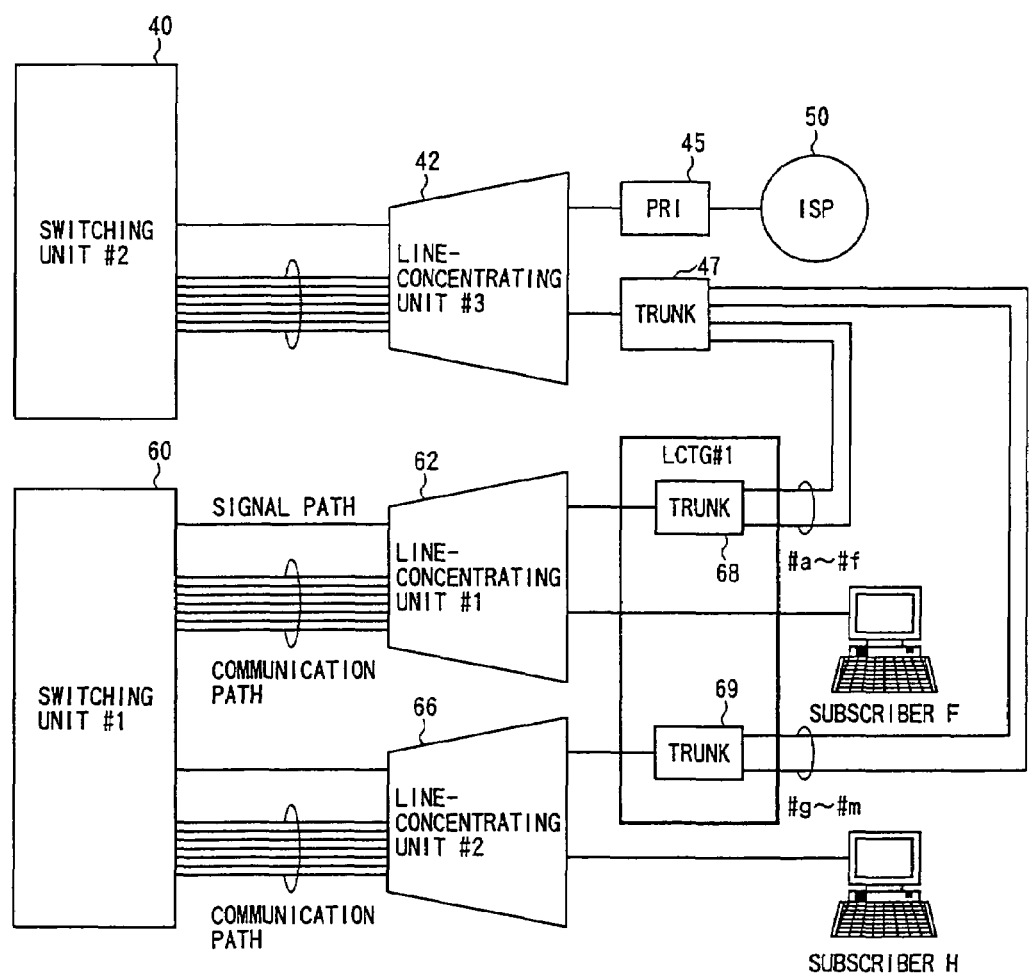
FIG. 5 is a block diagram showing a switching system used for describing a first method to control a line-concentrating unit to connect lines.

FIG. 5 is a block diagram showing a switching system used for describing a first method to control a line-concentrating unit to connect lines. In the first method, a description will be given of a case that the subscriber F connects to the ISP network 50 by a dial-up connection. Each unit with a number shown in FIG. 5 corresponds to a unit with the same number shown in FIG. 2. As shown in FIG. 5, the line-concentrating unit 42 (a line-concentrating unit #3) is connected to the switching unit 40 (a switching unit #2). The ISP network 50 is connected to the line-concentrating unit 42 through the PRI 45. Additionally, the trunk 47 is connected to the line-concentrating unit 42. The line-concentrating unit 62 (a line-concentrating unit #1) and the line-concentrating unit 66 (a line-concentrating unit #2) are connected to the switching unit 60 (a switching unit #1). The subscriber F and the trunk 68 are connected to the line-concentrating unit 62. The subscriber H and the trunk 69 are connected to the line-concentrating unit 66.

Figure 6:
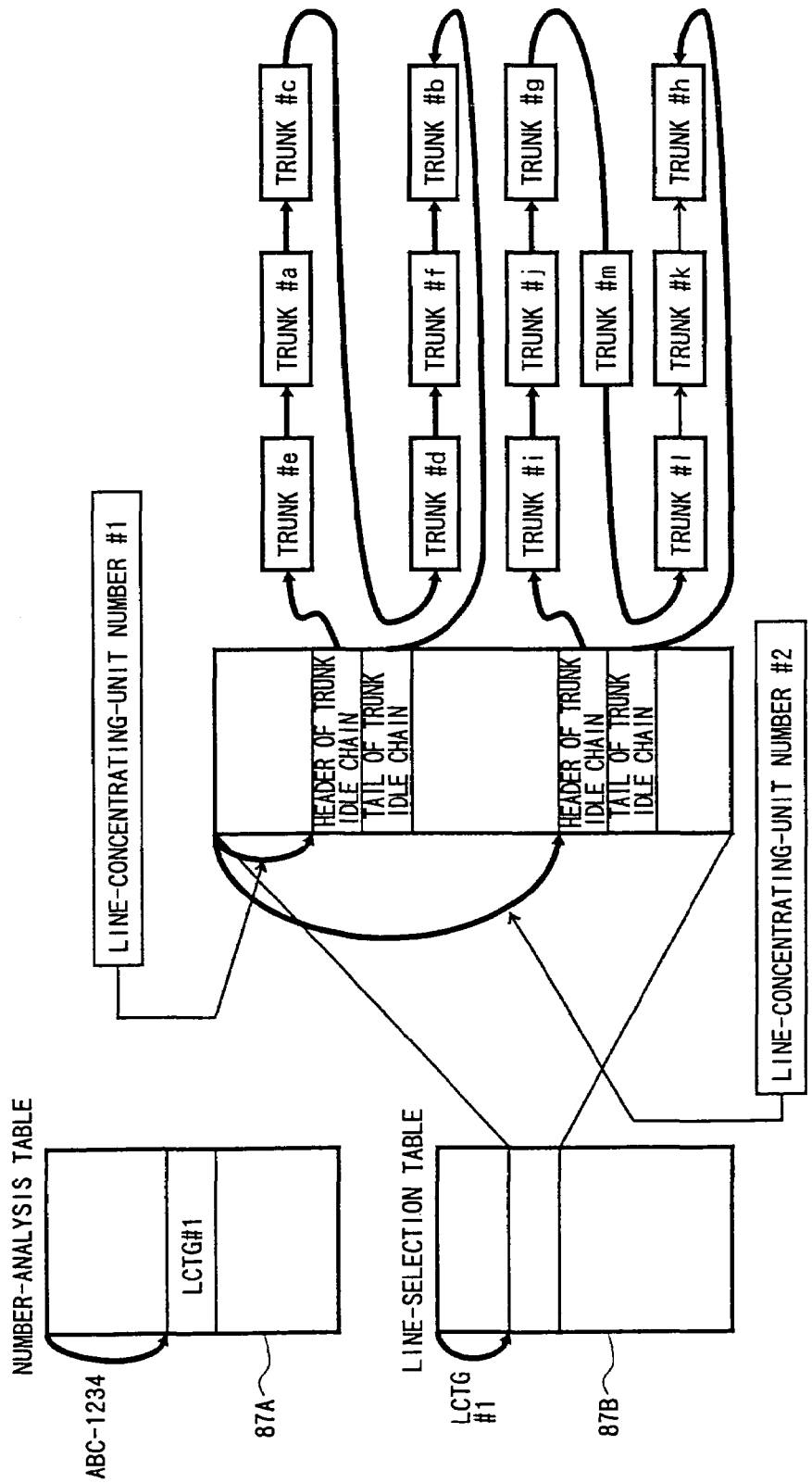
FIG. 6 is a block diagram showing a number-analysis table 87A and a line-selection table 87B included in the interface-selecting data table 87.

The switching unit 60 includes the above-described number-analysis table 87A and the line-selection table 87B shown in FIG. 6. A dial-up access number of the ISP network 50 "ABC-1234" is registered as an entry in the number-analysis table 87A as shown in FIG. 6. An LCTG #1 that includes a group of line-connection interfaces (trunks) #a through #m is registered as data to be selected as a result of a number analysis executed with the dial-up access number "ABC-1234" in the number-analysis table 87A. Additionally, the line-selection table 87B initially stores contents of the LCTG #1, which are the line-connection interfaces #a through #f located under the line-concentrating unit 62 (the line-concentrating unit #1) for a line-concentrating-unit number #1, and the line-connection interfaces #g through #m located under the line-concentrating unit 66 (the line-concentrating unit #2) for a line-concentrating-unit number #2. On the other hand, the switching unit 40 includes the number-analysis table 87A shown in FIG. 7. In the number-analysis table 87A shown in FIG. 7, the PRI 45 that is an interface connecting to the ISP network 50 is registered corresponding to the dial-up access number of the ISP network 50 "ABC-1234".

Figure 8:
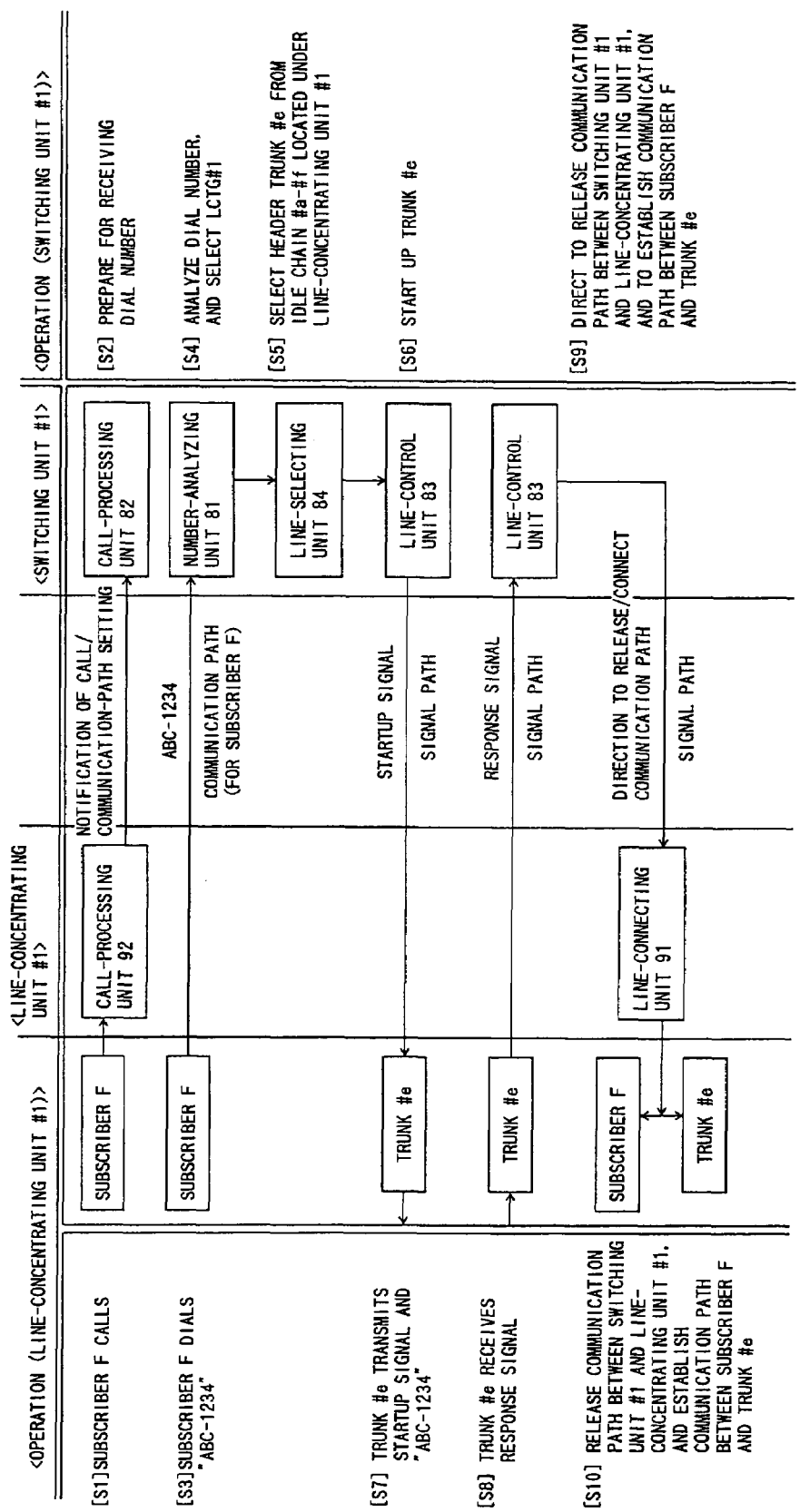
FIG. 8 is a diagram showing processes taken by a line-concentrating unit 62 and a switching unit 60 on a calling end in the first method to control the line-concentrating unit to connect lines.

FIG. 8 is a diagram showing processes taken by the line-concentrating unit 62 (the line-concentrating unit #1) and the switching unit 60 (the switching unit #1) on a calling end in the first method to control a line-concentrating unit to connect lines. At a step S1 shown in FIG. 8, a subscriber F located under the line-concentrating unit #1 calls for accessing the Internet. The call-processing unit 92 provided in the line-concentrating unit #1 detects the call made by the subscriber F, and sets a communication path to the switching unit #1, as well as notifies the switching unit #1 of the call made by the subscriber F and information about the subscriber F including such as its device number and line-concentrating-unit number through a signal path. At a step S2, the call-processing unit 82 provided in the switching unit #1 prepares for receiving a dial number from the line-concentrating unit #1 after being notified about the call made by the subscriber F by the line-concentrating unit #1. At a step S3, the subscriber F dials a dial-up access number (a dial number) of the ISP network 50 "ABC-1234". This dial number "ABC-1234" is then transmitted from the line-concentrating unit #1 through the communication path to the switching unit #1. Subsequently, at a step S4, the number-analyzing unit 81 of the switching unit #1 analyzes the dial number "ABC-1234" received from the line-concentrating unit #1 and selects the LCTG #1 including a group of the line-connection interfaces by use of the number-analysis table 87A shown in FIG. 6. At a step S5, the line-selecting unit 84 provided in the number-analyzing unit 81 of the switching unit #1 searches through the line-selection table 87B shown in FIG. 6 by use of the line-concentrating-unit number #1 of the subscriber F and the LCTG #1 obtained from the number-analysis table 87A, thereby locating an idle chain of line-connection interfaces #a through #f that correspond to the line-concentrating-unit number #1. Subsequently, the line-selecting unit 84 selects the trunk #e, a header of the idle chain.

At a step S6, the line-control unit 83 provided in the switching unit #1 starts up the trunk #e selected by the line-selecting unit 84. At a step S7, the trunk #e located under the line-concentrating unit #1 transmits a startup signal and the dial number "ABC-1234" dialed by the subscriber F to a line-connection interface connected to the line-concentrating unit #3 located under the switching unit #2. It should be noted that a description about processes executed by the line-concentrating unit #3 and the switching unit #2 will be given later. At a step S8, after receiving a response signal from the switching unit #2, the trunk #e transmits the response signal via the line-concentrating unit #1 through the signal path to the line-control unit 83 provided in the switching unit #1. At a step S9, after receiving the response signal from the trunk #e, the line-control unit 83 directs the line-connecting unit 91 provided in the line-concentrating unit #1 to release the communication path that has been secured for the subscriber F between the line-concentrating unit #1 and the switching unit #1 and to connect a communication path between the subscriber F and the trunk #e in the line-concentrating unit #1. At a step S10, the line-connecting unit 91, being directed by the line-control unit 83 of the switching unit #1 connects the communication path between the subscriber F and the trunk #e in the line-concentrating unit #1 and releases the communication path that has been secured for the subscriber F between the line-concentrating unit #1 and the switching unit #1. As a result of taking the above-described steps, the communication path between the subscriber F and the trunk #e is established without connecting through the switching unit #1.

Figure 7:
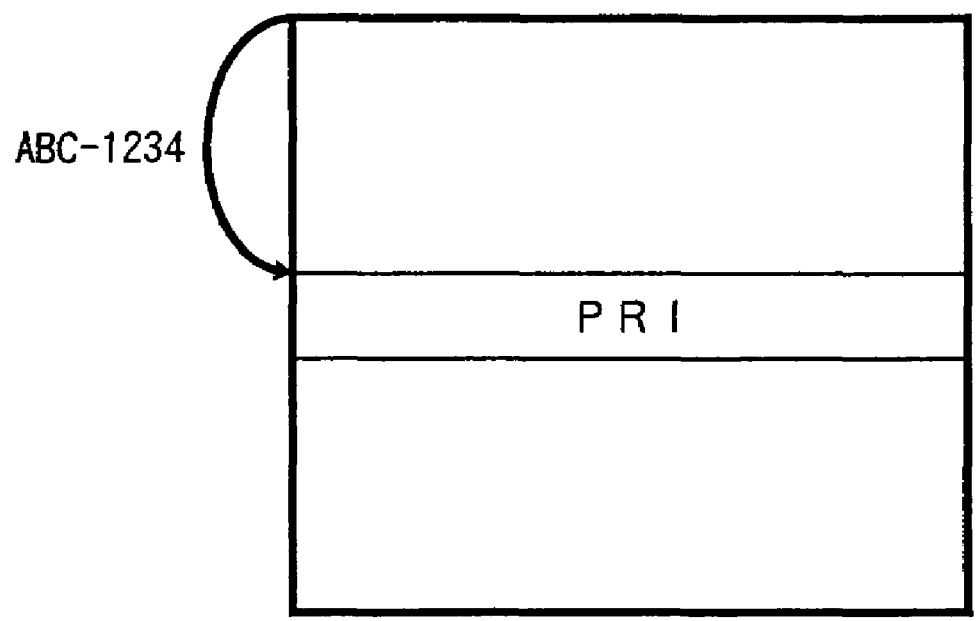
FIG. 7 is a block diagram showing another number-analysis table 87A.
Figure 9:
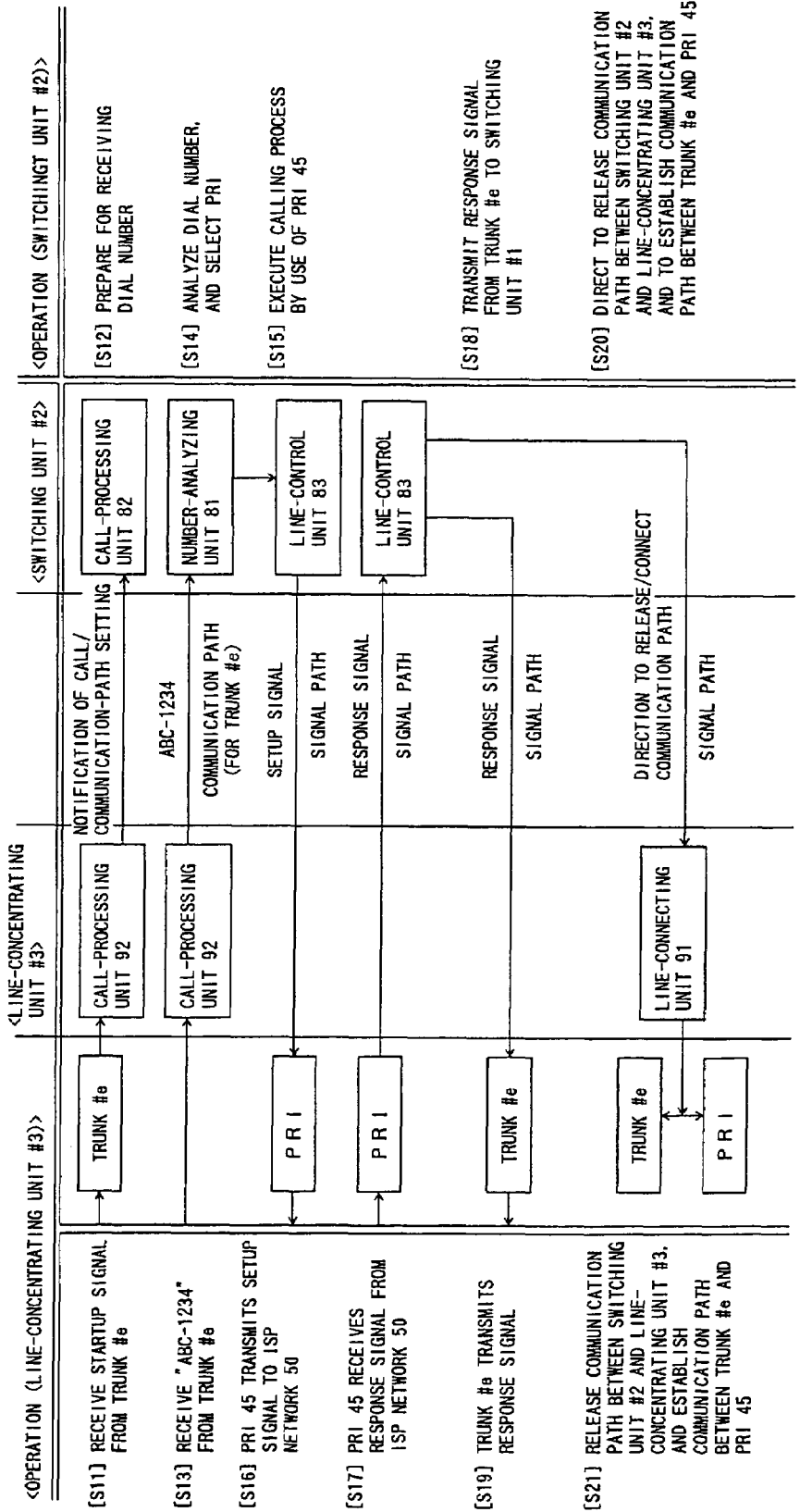
FIG. 9 is a diagram showing processes taken by a line-concentrating unit 42 and a switching unit 40 on a receiving end in the first method to control the line-concentrating unit to connect lines.

FIG. 9 is a diagram showing processes taken by the line-concentrating unit 42 (the line-concentrating unit #3) and the switching unit 40 (the switching unit #2) on a receiving end in the first method to control a line-concentrating unit to connect lines. At a step S11, after receiving the startup signal transmitted from the trunk #e at the step S7, the call-processing unit 92 provided in the line-concentrating unit #3 secures a communication path between the line-concentrating unit #3 and the switching unit #2, and notifies the switching unit #2 about the reception of the startup signal from the trunk #e. At a step S12, the call-processing unit 82 provided in the switching unit #2 prepares for receiving the dial number after being notified by the call-processing unit 92 of the line-concentrating unit #3 about the reception of the startup signal. At a step S13, the call-processing unit 92 of the line-concentrating unit #3 receives the dial number "ABC-1234" from the trunk #e, and transmits the dial number "ABC-1234" to the switching unit #2. At a step S14, after receiving the dial number "ABC-1234" from the line-concentrating unit #3, the number-analyzing unit 81 provided in the switching unit #2 analyzes the dial number, and then selects the PRI 45 that is a line-connection interface connected to the ISP network 50 as shown in FIG. 7. Subsequently, at a step S15, the line-control unit 83 provided in the switching unit #2 executes a calling process to the ISP network 50 by use of the PRI 45. At a step S16, the PRI 45 transmits a setup signal to the ISP network 50. After receiving a response signal transmitted from the ISP network 50, the PRI 45 notifies the switching unit #2 about the reception of the response signal at a step S17. At a step S18, the line-control unit 83 executes a response signal transmitting process after being notified about the response signal transmitted from the ISP network 50. At a step S19, the trunk #e transmits another response signal to the switching unit #1. Subsequently, at a step S20, the line-control unit 83 provided in the switching unit #2 directs the line-connecting unit 91 provided in the line-concentrating unit #3 to release the communication path that has been secured for the trunk #e between the line-concentrating unit #3 and the switching unit #2, and to connect a communication path between the trunk #e and the PRI 45 in the line-concentrating unit #3. At a step S21, the line-connecting unit 91, being directed by the line-control unit 83 of the switching unit #2, connects the communication path between the trunk #e and the PRI 45 in the line-concentrating unit #3, and releases the communication path that has been secured for the trunk #e between the line-concentrating unit #3 and the switching unit #2. As a result of taking the above-described steps, the communication path between the trunk #e and the PRI 45 is established without connecting through the switching unit #2. Consequently, after taking the steps S1 through S21, a communication path is established between the subscriber F and the ISP network 50.

Accordingly, a call to a specific dial number can be connected at a line-concentrating unit without going through a switching unit, since a trunk that connects lines located under a single line-concentrating unit is selected by searching through the line-selection table 87B by use of a line-concentrating-unit number of the line-concentrating unit accessed by a subscriber making the call and a LCTG number obtained from the number-analysis table 87A.

Figure 10:
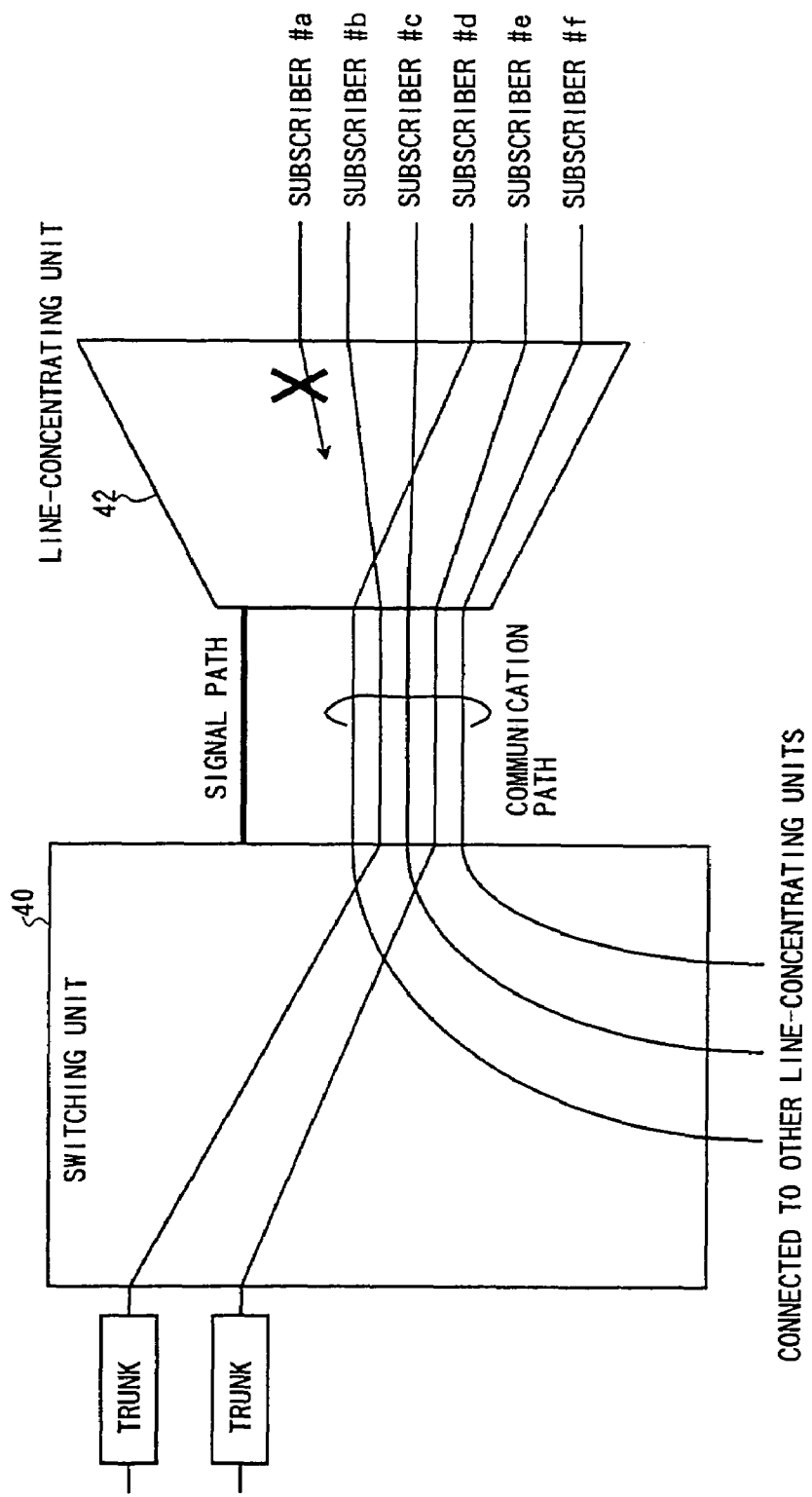
FIG. 10 is a block diagram showing overcrowding of communication paths between a switching unit and a line-concentrating unit.

In a case that all of communication paths between the line-concentrating unit 42 (the line-concentrating unit #3) and the switching unit 40 (the switching unit #2) are being used and overcrowded as shown in FIG. 10, the signal-transmitting unit 93 provided in the line-concentrating unit 42 transmits an overcrowding-process message included in an overcrowding-process signal through the signal path to the switching unit 40 after the call-processing unit 92 provided in the line-concentrating unit 42 has detected overcrowding of the communication paths. The overcrowding-process message includes a message number, location information of a subscriber and a line-concentrating-unit number as shown in FIG. 11. After receiving the overcrowding-process message from the signal-transmitting unit 93 of the line-concentrating unit 42, the signal-receiving unit 85 included in the line-control unit 83 of the switching unit 40 starts up the overcrowding-control unit 86. Subsequently, the overcrowding-control unit 86 obtains a line-concentrator-trunk-group number (LCTG) #i with reference to the line-selecting data table 88 shown in FIG. 12 that is used for selecting a line when communication paths are overcrowded, and selects a line-connection interface located under the same line-concentrating unit as a subscriber who has made a call to a specific dial number from line-connection interfaces registered on the line-selection table 87B. Additionally, the line-control unit 83 starts up the selected line-connection interface as well as directs the line-connecting unit 91 of the line-concentrating unit 42 to establish a communication path between the subscriber and the selected line-connection interface in the line-concentrating unit 42.

Figure 13:
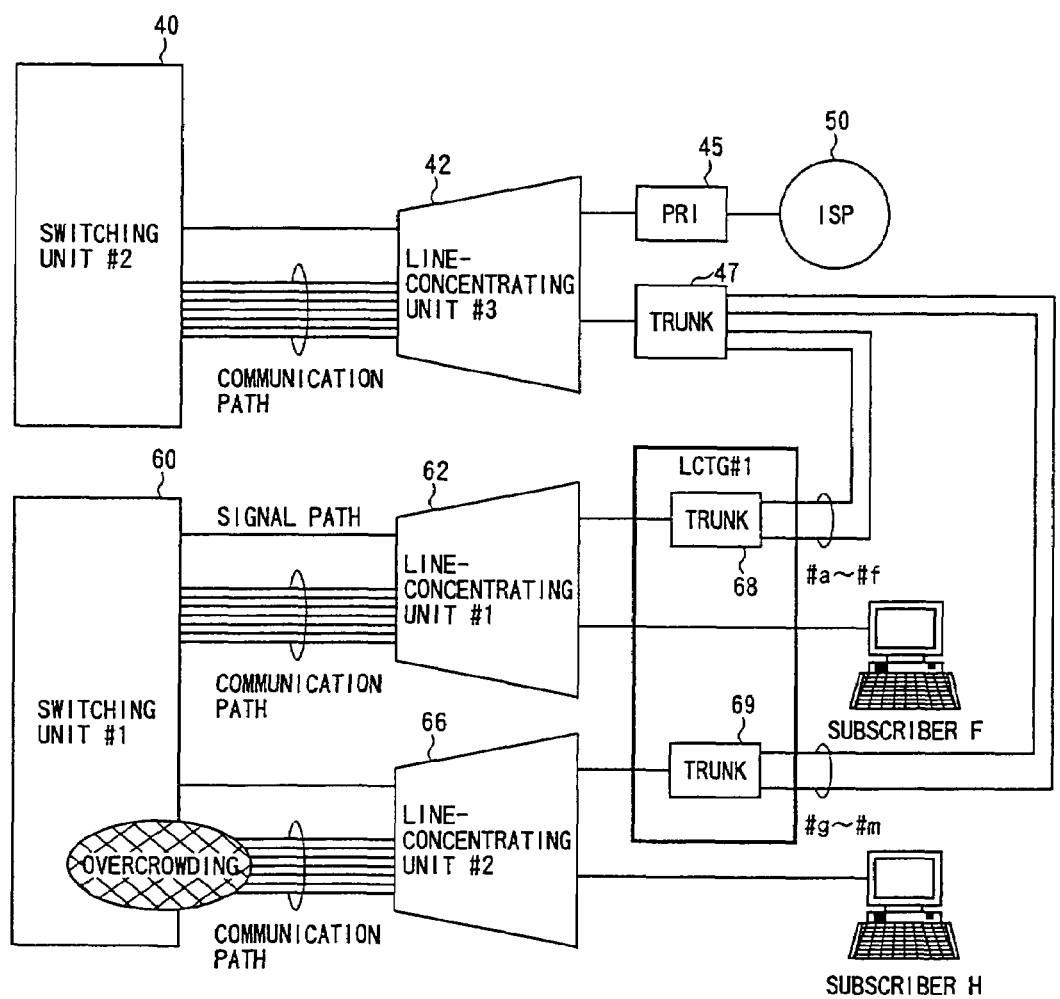
FIG. 13 is a block diagram showing a second method to control the line-concentrating unit to connect lines according to the present invention.

FIG. 13 is a block diagram showing a second method to control a line-concentrating unit to connect lines according to the present invention. In FIG. 13, each unit with a number corresponds to a unit with the same number in FIG. 2. A case in which a subscriber H connects to the ISP network 50 by a dial-up connection will be described in the second method. As shown in FIG. 13, the line-concentrating unit 42 (the line-concentrating unit #3) is connected to the switching unit 40 (the switching unit #2). The ISP network 50 is connected to the line-concentrating unit 42 through the PRI 45. Additionally, the trunk 47 is connected to the line-concentrating unit 42. The line-concentrating unit 62 (the line-concentrating unit #1) and the line-concentrating unit 66 (the line-concentrating unit #2) are connected to the switching unit 60 (the switching unit #1). The subscriber F and the trunk 68 are connected to the line-concentrating unit 62. The subscriber H and the trunk 69 are connected to the line-concentrating unit 66. The trunks 68 and 69 are connected to the line-concentrating unit 42 through the trunk 47. In addition, it is assumed that the line-concentrating unit 66 is overcrowded.

Figure 14:
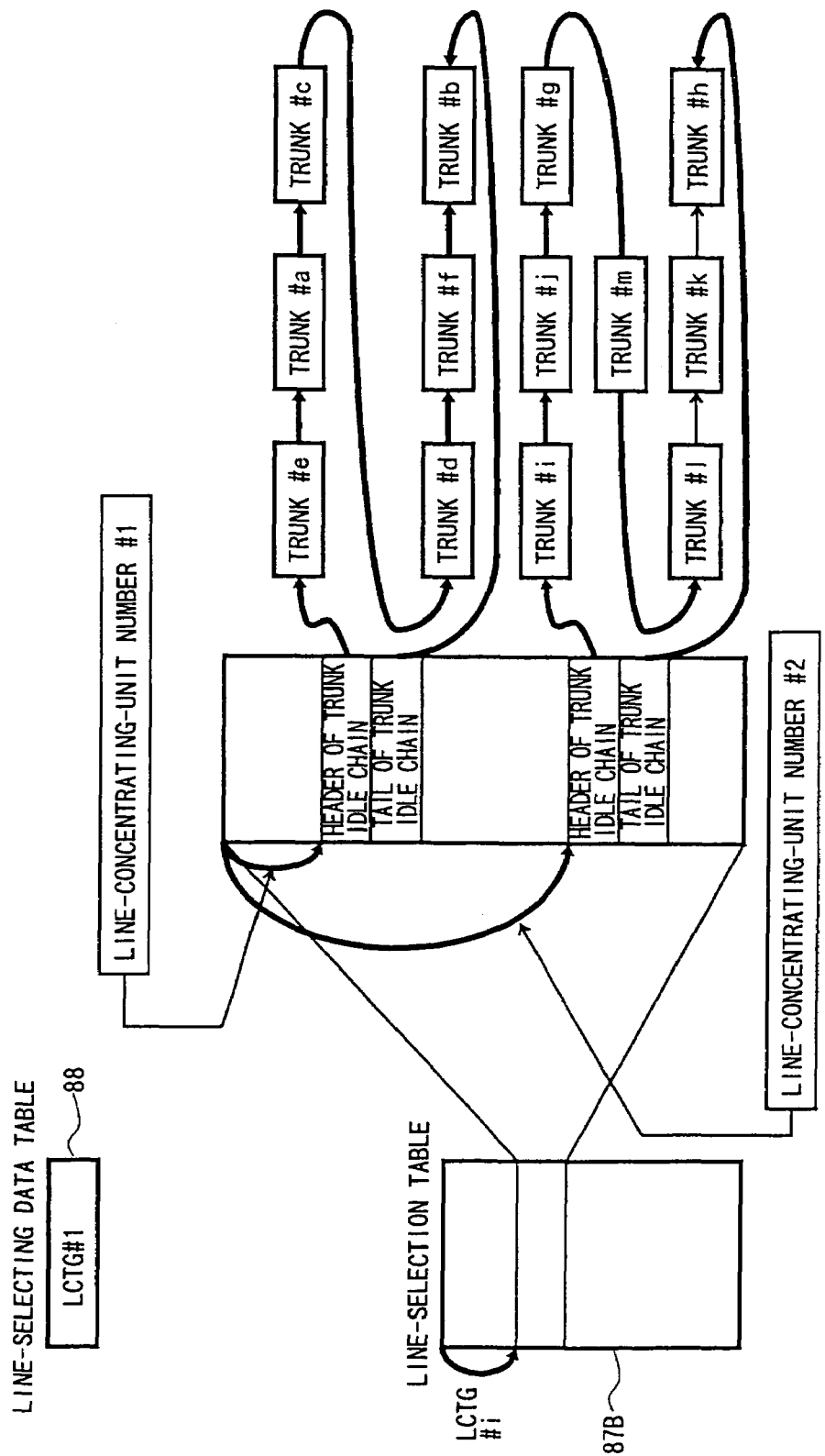
FIG. 14 is a diagram showing the line-selection table 87B and the line-selecting data table 88.
Figure 15:
FIG. 15 is a diagram showing the number-analysis table 87A.

The switching unit 60 includes the line-selection table 87B and the line-selecting data table 88 as shown in FIG. 14. The LCTG #1 that includes a group of line-connection interfaces (trunks) #a through #m is registered as data to be selected in the line-selecting data table 88. Additionally, the line-selection table 87B initially stores contents of the LCTG #1 which are the line-connection interfaces #a through #f located under the line-concentrating unit 62 for the line-concentrating-unit number #1 and the line-connection interfaces #g through #m located under the line-concentrating unit 66 for the line-concentrating-unit number #2. On the other hand, the switching unit 40 includes the number-analysis table 87A shown in FIG. 15. In the number-analysis table 87A shown in FIG. 15, the PRI 45 that is an interface connecting to the ISP network 50 is registered corresponding to the dial-up access number of the ISP network 50 "ABC-1234".

Figure 16:
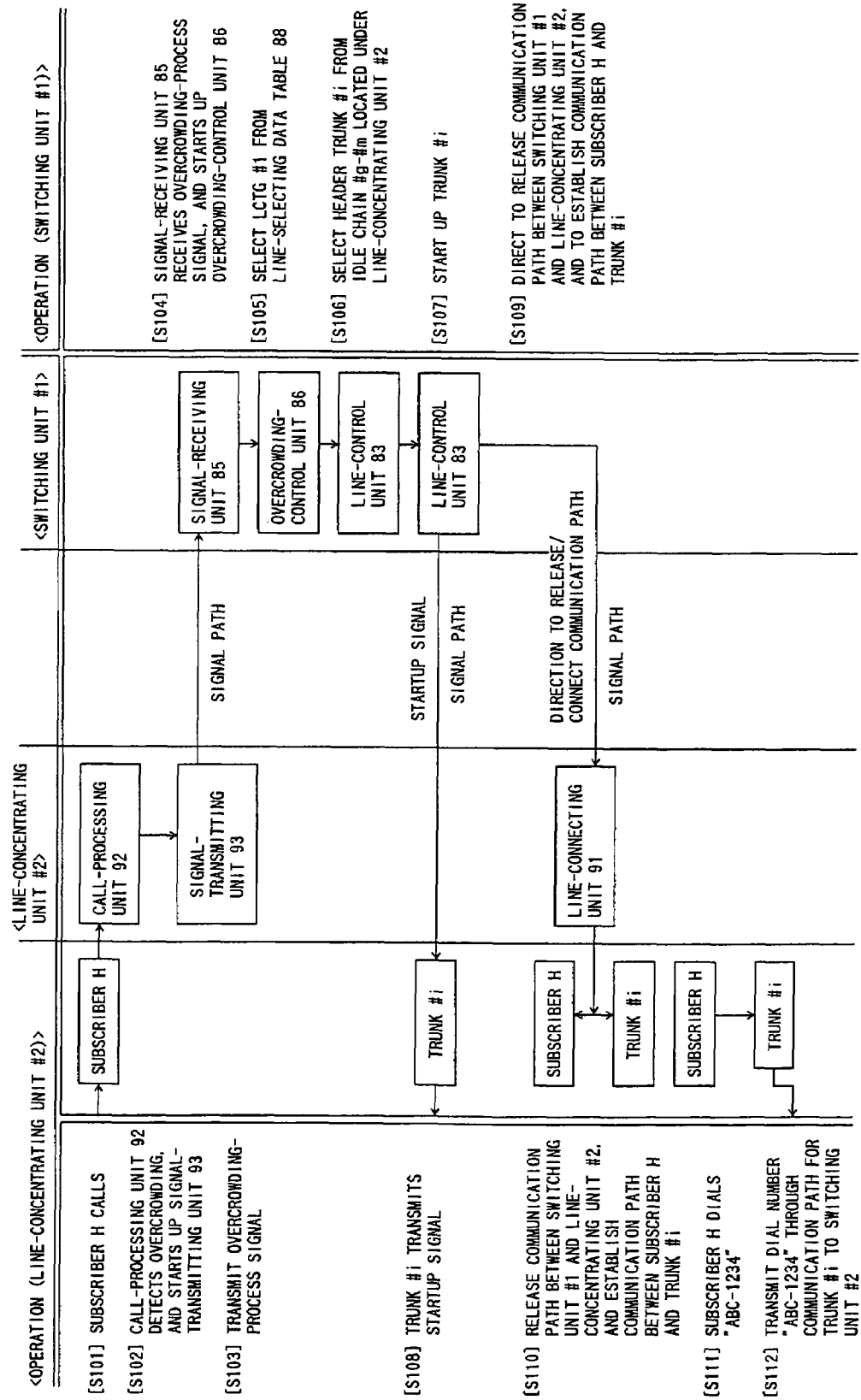
FIG. 16 is a diagram showing processes taken by a line-concentrating unit 66 and the switching unit 60 on the calling end in the second method to control the line-concentrating unit to connect lines.

FIG. 16 is a diagram showing processes taken by the line-concentrating unit 66 (the line-concentrating unit #1) and the switching unit 60 (the switching unit #1) on a calling end in the second method to control a line-concentrating unit to connect lines. At a step S101 shown in FIG. 16, a subscriber H located under the line-concentrating unit #2 calls for accessing the Internet. At a step S102, the call-processing unit 92 provided in the line-concentrating unit #2 starts up the signal-transmitting unit 93 provided therein since the line-concentrating unit 2 is overcrowded. Subsequently, at a step S103, the signal-transmitting unit 93 transmits an overcrowding-process signal including an overcrowding-process message to the switching unit #1 through a signal path located between the switching unit #1 and the line-concentrating unit #2. At a step S104, the signal-receiving unit 85 provided in the switching unit #1 starts up the overcrowding-control unit 86 after receiving the overcrowding-process signal from the line-concentrating unit #2. At a step S105, the overcrowding-control unit 86 selects the LCTG #1 with reference to the line-selecting data table 88. At a step S106, the overcrowding-control unit 86 searches through the line-selection table 87B by use of the line-concentrating-unit number #2 of the subscriber H and the LCTG #1 thereby locating an idle chain of the line-connection interfaces #g through #m that correspond to the line-concentrating-unit number #2. Subsequently, the line-selecting unit 84 selects the trunk #i, a header of the idle chain. At a step S107, the line-control unit 83 provided in the switching unit #1 starts up the trunk #i. At a step S108, the trunk #i located under the line-concentrating unit #2 transmits a startup signal to a line-connection interface connected to the line-concentrating unit #3 located under the switching unit #2 by a startup process taken by the switching unit #1. It should be noted that a description about processes executed by the line-concentrating unit #3 and the switching unit #2 will be given later. At a step S109, the line-control unit 83 of the switching unit #1 directs line-connecting unit 91 of the line-concentrating unit #2 to establish a communication path between the subscriber H and the trunk #i therein. Subsequently, at a step S110, the line-connecting unit 91 provided in the line-concentrating unit #2, being directed by the line-control unit 83 of the switching unit #1, establishes the communication path between the subscriber H and the trunk #i therein. At a step Sill, the subscriber H dials the number "ABC-1234". Then the number "ABC-1234" is transmitted to the switching unit #2 through the line-concentrating unit #2 and the trunk #i at a step S112. By taking the above-described steps, the communication path is established between the subscriber H and the trunk #i in the line-concentrating unit #2 and not through the switching unit #1.

Figure 17:
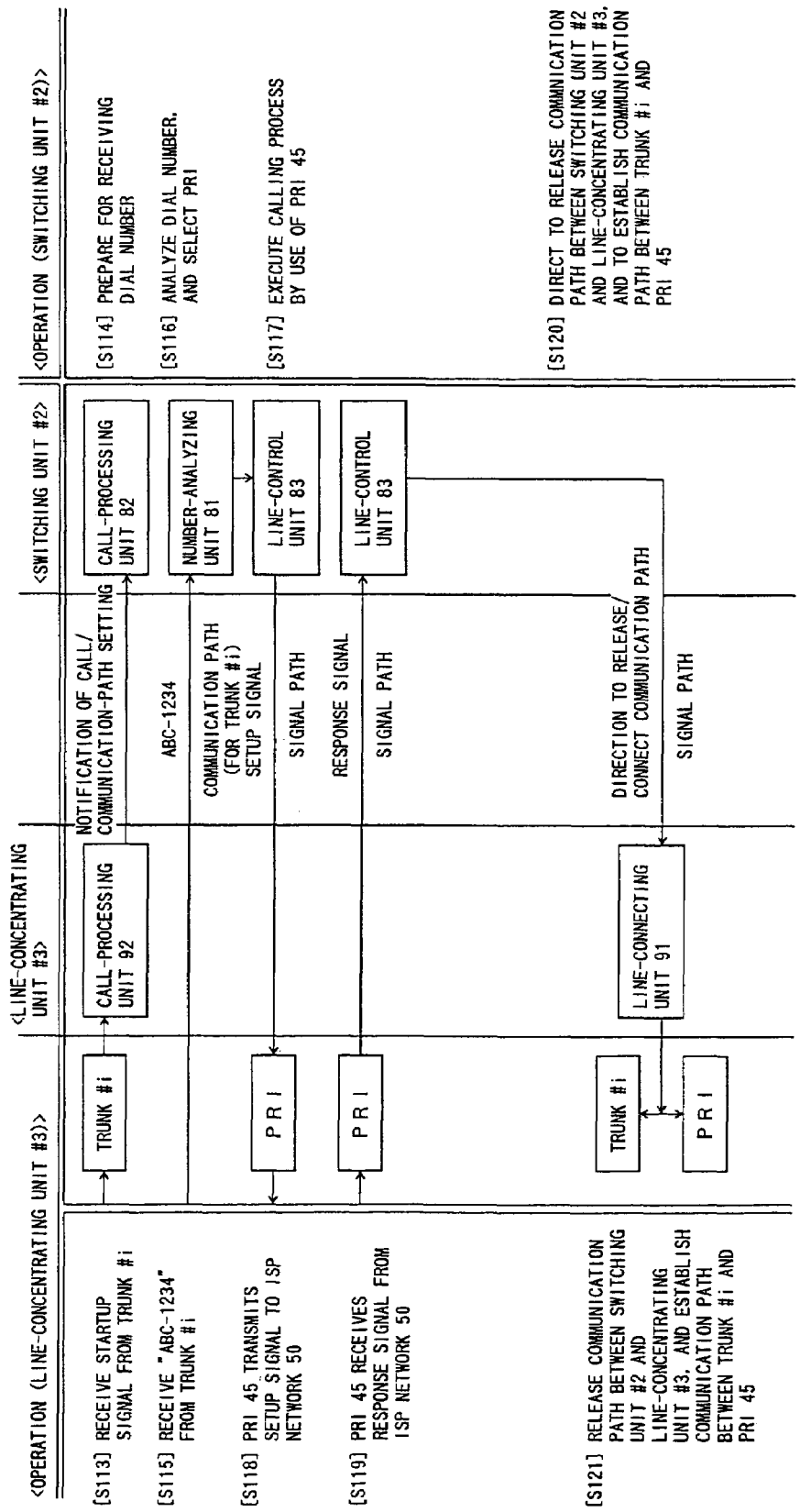
FIG. 17 is a diagram showing processes taken by the line-concentrating unit 42 and the switching unit 40 on the receiving end in the second method to control the line-concentrating unit to connect lines.

FIG. 17 is a diagram showing processes taken by the line-concentrating unit 42 (the line-concentrating unit #3) and the switching unit 40 (the switching unit #2) on a receiving end in the second method to control a line-concentrating unit to connect lines. At a step S113, after receiving the startup signal that has been transmitted from the trunk #i at the step S108, the call-processing unit 92 provided in the line-concentrating unit #3 secures a communication path between the line-concentrating unit #3 and the switching unit #2 as well as notifies the switching unit #2 about reception of the startup signal that has been transmitted from the trunk #i. At a step S114, the call-processing unit 82 provided in the switching unit #2 prepares for receiving a dial number after being notified about the reception of the startup signal. At a step S115, the line-concentrating unit #3 receives the dial number "ABC-1234" from the trunk #i, and transmits the dial number "ABC-1234" to the switching unit #2. After receiving the dial number "ABC-1234" from the line-concentrating unit #3, the number-analyzing unit 81 of the switching unit #2 analyzes the dial number "ABC-1234," thereby selecting the PRI 45 that is an interface connected to the ISP network 50 with reference to the number-analysis table 87A at a step S116. At a step S117, the line-control unit 83 of the switching unit #2 executes a call process to the ISP network 50 by use of the PRI 45. Following the call process that has been executed by the line-control unit 83, the PRI 45 transmits a setup signal to the ISP network 50 at a step S118. At a step S119, the PRI 45 receives a response signal transmitted from the ISP network 50, and notifies the switching unit #2 about reception of the response signal. At a step S120, the line-control unit 83 of the switching unit #2 directs the line-connecting unit 91 of the line-concentrating unit #3 to release the communication path that has been secured for the trunk #i, and to establish a communication path between the trunk #i and the PRI 45 in the line-concentrating unit #3. Then, at a step S121, the line-connecting unit 91 establishes the communication path between the trunk #i and the PRI 45 therein, and releases the communication path that has been established for the trunk #i between the line-concentrating unit #3 and the switching unit #2. Accordingly, by taking the above-described steps, the communication path is established between the trunk #i and the PRI 45 in the line-concentrating unit #3 without going through the switching units #1 and #2.

Accordingly, when a communication path between a line-concentrating unit and a switching unit is overcrowded, a call made by a subscriber located under the switching unit can be connected to a destination address or dial number through another switching unit by connecting lines located under the line-concentrating unit since a trunk that connects lines located under the line-concentrating unit is selected by searching through the line-selection table 87B by use of a line-concentrating-unit number of the line-concentrating unit accessed by a subscriber making the call and a LCTG number obtained from the line-selecting data table 88.

As described above, the switching system according to the present invention can prevent overcrowding of a communication path by separating communication paths used by ISP-connection subscribers and general subscribers. Additionally, the switching system does not need to add extra trunks to each of the switching units 40 and 60 for connecting the switching units 40 and 60. Furthermore, a common carrier can easily maintain and manage the switching system, and can keep maintaining a call to connect to an ISP network and a general call as before since communication paths used by the ISP-connection subscribers and the general subscribers can be separated.

Figure 18:
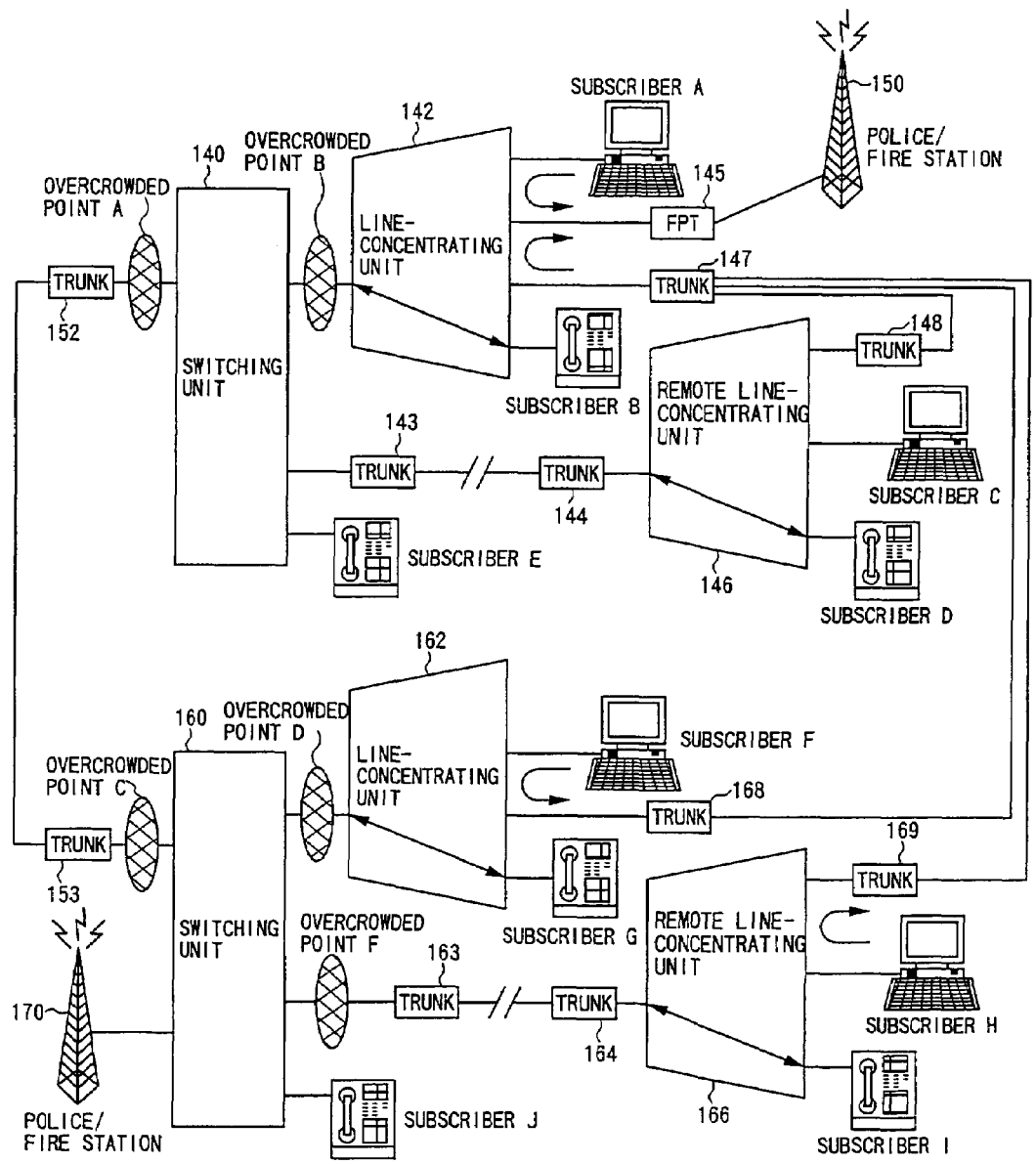
FIG. 18 is a block diagram showing a network system where the switching unit of the present invention is adopted according to the fourth embodiment of the present invention.

A description will now be given of a network system where the switching unit of the present invention is adopted according to a fourth embodiment of the present invention with reference to FIG. 18. FIG. 18 shows a network system that can secure a line for an emergency call. As shown in FIG. 18, a line-concentrating unit 142 is connected to a switching unit 140. Additionally, a remote line-concentrating unit 146 is connected to the switching unit 140 through trunks 143 and 144. A subscriber A, a subscriber B and a trunk 147 are connected to the line-concentrating unit 142. A police/fire station 150 is connected to the line-concentrating unit 142 through a FPT (Fire Police Trunk) 145. A subscriber C, a subscriber D and a trunk 148 are connected to the remote line-concentrating unit 146, wherein the trunk 148 is connected to the line-concentrating unit 142 through the trunk 147. In addition, a subscriber E is connected to the switching unit 140. Furthermore, a switching unit 160 is connected to the switching unit 140 through trunks 152 and 153. A line-concentrating unit 162, a subscriber J and a police/fire station 170 are connected to the switching unit 160. In addition, a remote line-concentrating unit 166 is connected to the switching unit 160 through trunks 163 and 164. A subscriber F, a subscriber G and a trunk 168 are connected to the line-concentrating unit 162, wherein the trunk 168 is connected to the line-concentrating unit 142 through the trunk 147. A subscriber H, a subscriber I and a trunk 169 are connected to the remote line-concentrating unit 166, wherein the trunk 169 is connected to the line-concentrating unit 142 through the trunk 147.

For instance, in a case that overcrowding occurs at overcrowded points A through E because of increase in communication traffic caused by unusual conditions such as a disaster at the switching unit 160, the subscriber G cannot normally reach either of police/fire stations 150 and 170 even if the subscriber G tries to make an emergency call because of the overcrowding. However, with the present invention, the subscriber G can reach the police/fire station 150 by using the FPT 145 provided under the line-concentrating unit 142. When the subscribers C and D access the police/fire station 150, they are connected to the FPT 145 through the remote line-concentrating unit 146, the trunk 148, the trunk 147 and the line-concentrating unit 142, but not though the switching unit 140. When the subscribers F and G access the police/fire station 150, they are connected to the FPT 145 through the line-concentrating unit 162, the trunk 168, the trunk 147 and the line-concentrating unit 142, but not through the switching units 140 and 160. Similarly, when the subscribers H and I access the police/fire station 150, they are connected to the FPT 145 through the remote line-concentrating unit 166, the trunk 169, the trunk 147 and the line-concentrating unit 142. On the other hand, calls among the subscribers D, E, I and J are made through the switching units 140 and 160 as before.

The above description is provided in order to enable any person skilled in the art to make and use the invention and sets forth the best mode contemplated by the inventors of carrying out the invention.

The present invention is not limited to the specially disclosed embodiments, and variations and modifications may be made without departing from the scope and spirit of the invention.

The present application is based on Japanese Priority Application No. 2000-099379, filed on Mar. 31, 2000, the entire contents of which are hereby incorporated by reference.

What is claimed is:

1. A switching system including a switching unit and a line concentrator, said switching unit comprising:
- a number-analyzing unit that analyzes a dial number notified through said line concentrator;
- a line-selecting unit that selects lines that are accommodated by said line concentrator and are connected to other line concentrators,
- a number-analysis table including trunk-group numbers initially registered for dial numbers that are used for connecting the line concentrator to the other line concentrators,
- a line-selection table including a chain of idle trunks corresponding to a trunk-group number selected from said number-analysis table by said number-analyzing unit by use of said dial number and to a line-concentrator number of the line concentrator accessed by said dial number, said line concentrator comprising a line-connecting unit that connects said lines, wherein said line-selecting unit selects the lines and directs said line-connecting unit to connect said lines together when said number-analyzing unit determines that said dial number is used for connecting said line concentrator to the other line concentrators, thereby connecting said line concentrator to the other line; and wherein said line-selecting unit selects an idle trunk connecting said lines from said line-selection table by use of said trunk-group number and said line-concentrator number.

2. The switching system as claimed in claim 1, wherein said line concentrator further comprises a signal-transmitting unit transmitting an overcrowding-process signal through a signal path to said switching unit when a communication path provided between said line concentrator and said switching unit is determined to be overcrowded, wherein said switching unit further comprises a signal-receiving unit receiving the overcrowding-process signal from said signal-transmitting unit, and an overcrowding-control unit directing said line-connecting unit to connect said lines when said signal-receiving unit receives the overcrowding-process signal from said signal-transmitting unit, thereby connecting said line concentrator to the other line concentrators.

* * * * *